(12) United States Patent
Springs et al.

(10) Patent No.: US 8,770,348 B2
(45) Date of Patent: Jul. 8, 2014

(54) UNIVERSAL ADJUSTABLE SLING TYPE SEAT

(76) Inventors: Charles G. Springs, Hemingway, SC (US); Nicholas Mullinax, Anderson, SC (US)

( * ) Notice: Subject to any disclaimer, the term of this patent is extended or adjusted under 35 U.S.C. 154(b) by 97 days.

(21) Appl. No.: 13/317,577

(22) Filed: Oct. 21, 2011

(65) Prior Publication Data

US 2013/0098710 A1    Apr. 25, 2013

(51) Int. Cl.
*A01M 31/02* (2006.01)

(52) U.S. Cl.
USPC ............... 182/187; 5/122; 297/4; 297/228.12

(58) Field of Classification Search
USPC ............ 182/135, 187, 6, 7, 3, 138, 139, 188; 297/440.11, 463, 4, 228.12; 5/122
See application file for complete search history.

(56) References Cited

U.S. PATENT DOCUMENTS

| | | | | |
|---|---|---|---|---|
| 968,017 A * | 8/1910 | Wilson | ................ | 5/121 |
| 1,971,294 A * | 8/1934 | Bunker | ............ | 5/89.1 |
| 2,549,679 A * | 4/1951 | Foote | ............ | 182/187 |
| 2,722,968 A * | 11/1955 | Smith | ............ | 182/187 |
| 2,829,702 A * | 4/1958 | Keating | ............ | 297/183.9 |
| 3,024,068 A * | 3/1962 | Eames | ............ | 297/452.13 |
| 3,061,374 A * | 10/1962 | Grosfillex | ............ | 297/440.11 |
| 3,379,474 A * | 4/1968 | Schwarz, Jr. | ............ | 297/440.11 |
| 3,700,278 A * | 10/1972 | Gulba | ............ | 297/188.07 |
| D242,307 S * | 11/1976 | Furino | ............ | D6/347 |
| 4,251,106 A * | 2/1981 | Gilbert | ............ | 297/18 |
| 4,337,844 A | 7/1982 | Hice, Sr. | | |
| 4,338,691 A * | 7/1982 | Gaffney | ............ | 4/562.1 |
| 4,347,914 A * | 9/1982 | Gary | ............ | 182/142 |
| 4,474,265 A * | 10/1984 | Shinkle | ............ | 182/187 |
| 4,589,522 A * | 5/1986 | Shelton | ............ | 182/187 |
| 4,705,143 A | 11/1987 | Ziemba | | |
| 4,759,425 A * | 7/1988 | Turner | ............ | 182/187 |
| 5,307,526 A * | 5/1994 | Appleby | ............ | 4/460 |
| 5,413,192 A * | 5/1995 | Woller et al. | ............ | 182/187 |
| 5,423,644 A * | 6/1995 | First, Sr. | ............ | 410/100 |
| 5,454,445 A * | 10/1995 | Berryman | ............ | 182/116 |
| 5,685,395 A | 11/1997 | Nelson | | |
| 6,367,583 B1 * | 4/2002 | Derby | ............ | 182/3 |
| 6,481,529 B1 * | 11/2002 | Voorhies | ............ | 182/20 |
| 6,508,389 B1 * | 1/2003 | Ripoyla et al. | ............ | 224/157 |
| 7,125,075 B2 * | 10/2006 | Thompson | ............ | 297/230.1 |
| D548,996 S * | 8/2007 | Cox | ............ | D6/368 |
| 7,258,401 B2 * | 8/2007 | Smith | ............ | 297/463.2 |
| 7,370,728 B1 * | 5/2008 | Mann | ............ | 182/187 |
| 7,631,728 B2 * | 12/2009 | Hill et al. | ............ | 182/3 |

(Continued)

OTHER PUBLICATIONS

Definition of 'edge' found in Reasons for Allowance The American Heritage® Dictionary of the English Language, Fourth Edition copyright © 2000 by Houghton Mifflin Company. Updated in 2009. Published by Houghton Mifflin Company. All rights reserved.*

*Primary Examiner* — Daniel Cahn
(74) *Attorney, Agent, or Firm* — Robert H. Williams

(57) ABSTRACT

A sling-type seat that can be used by hunters as a replacement for conventional treestand seats. The seat is attachable to an external support and/or frame, such as a tree trunk and treestand frame. The attachment is not limited to predefined attachment points and is thereby adjustable. The seat can be attached to a wide range of supports and/or frames and is therefore universal. Further, the seat is portable and may be rolled up and easily carried.

9 Claims, 3 Drawing Sheets

(56) References Cited

U.S. PATENT DOCUMENTS

| | | | |
|---|---|---|---|
| 8,205,626 B2* | 6/2012 | Myers | 135/90 |
| 8,267,050 B1* | 9/2012 | Hatcher et al. | 119/797 |
| 2002/0067036 A1* | 6/2002 | Young et al. | 280/819 |
| 2002/0139615 A1 | 10/2002 | Penz et al. | |
| 2003/0024559 A1* | 2/2003 | Fields | 135/90 |
| 2003/0028962 A1* | 2/2003 | Batchelder et al. | 5/120 |
| 2004/0159687 A1* | 8/2004 | Eliason | 224/150 |
| 2005/0036883 A1* | 2/2005 | Edleston | 414/800 |
| 2009/0233535 A1* | 9/2009 | Boduch | 452/187 |
| 2010/0252361 A1* | 10/2010 | Wood | 182/6 |
| 2011/0308887 A1* | 12/2011 | Johnson | 182/187 |

\* cited by examiner

UNIVERSAL ADJUSTABLE SLING TYPE SEAT

BACKGROUND OF THE INVENTION

1. Field of the Invention

The present invention relates to a universal, adjustable sling seat usable with a variety of different supports and frames and configurable for use in multiple positions to provide optimal comfort. The present invention is useful for hunters as a replacement for the conventional seat found in common treestands.

2. Description of Related Art

Known treestands currently on the market employ a conventional seat type consisting of a seat cushion and a back cushion. Standard treestand seats rely on these thick and bulky cushions for comfort.

Existing treestands most commonly include seats attached to the frame thereof in a fixed manner. There are some treestands with seats capable of limited adjustments in position. One such example is U.S. Pat. No. 7,370,728, Mann, which discloses a seat that can be attached to one of a finite number of predefined attachment points on the frame. However, the present disclosure provides a seat that is adjustable in its position relative to the supporting tree as well as in its position relative to the treestand frame. Additionally, the present disclosure provides a seat that is not limited to predefined attachment points. Thus, the present disclosure provides a seat with a greater degree of adjustability than conventional seats known in the prior art.

The seat of Mann '728 can only be used with the frame having predefined attachment points. The present disclosure provides a seat that is universally adaptable to attach to a variety of treestands or other frames without the necessity of any predefined attachment points. Therefore, the present disclosure provides a universal seat that is advantageous over the prior art.

BRIEF SUMMARY OF THE INVENTION

Disclosed herein is a universal, adjustable, sling-type seat that can be used with existing treestands. The disclosed seat is universal in that it is capable of use with a variety of treestands, as well as other supports and frames. The disclosed seat is adjustable in that it enables the user to select from a variety of attachment positions relative to the support and frame. As a result, the disclosed seat is more comfortable than conventional seats which provide limited attachment positions. The disclosed seat can be made from webbing, resilient materials, and metal hardware.

The disclosed sling-type seat does not rely on thick bulky cushions as in the prior art. This is advantageous in that it is less cumbersome and more portable than conventional seats. The disclosed seat is lightweight and compact and can be carried or stored in a rolled up configuration. In an exemplary embodiment, the disclosed seat is approximately 3 inches thick and 18 inches long when rolled up.

The disclosed sling-type seat is adapted to connect to a known treestand frame, wherein the disclosed seat replaces the existing seat. The disclosed seat may be connected to at least two points on the treestand frame and also includes at least one means for connecting to a tree. Moreover, the connection points to the frame and tree are each adjustable so that the user can select from a range of possible seating positions to achieve maximum personal comfort. Accordingly, the user will be seated in a semi-reclined position without the necessity of relying on the tree for back support.

It should be noted that the disclosed seat is capable of use with other supports, such as a free-standing frame which rests on the ground. Such a frame and the disclosed seat may be used to provide an alternative to existing portable chairs commonly used for camping, tailgating, etc.

In a further embodiment, the disclosed sling-type seat includes an extra safety feature when utilized on most treestands. The means for connecting to a tree may be a strap which is wrapped around the tree trunk. This tree strap will stay in place even if the user falls from the stand and the stand becomes dislodged from the tree. Therefore, the user (who is wearing a fall restraint device, as recommended when hunting or climbing from an elevated position) will be able to retrieve his or her stand and re-position it on the tree, effecting a self-rescue.

In yet a further embodiment, the disclosed sling-type seat includes one or more roll straps for securing the seat in its rolled up configuration.

DETAILED DESCRIPTION

In the following description, relative terms such as "upper," "lower," "top," and "bottom" are with reference to the orientation shown generally in FIGS. 1-3.

Figure 1:
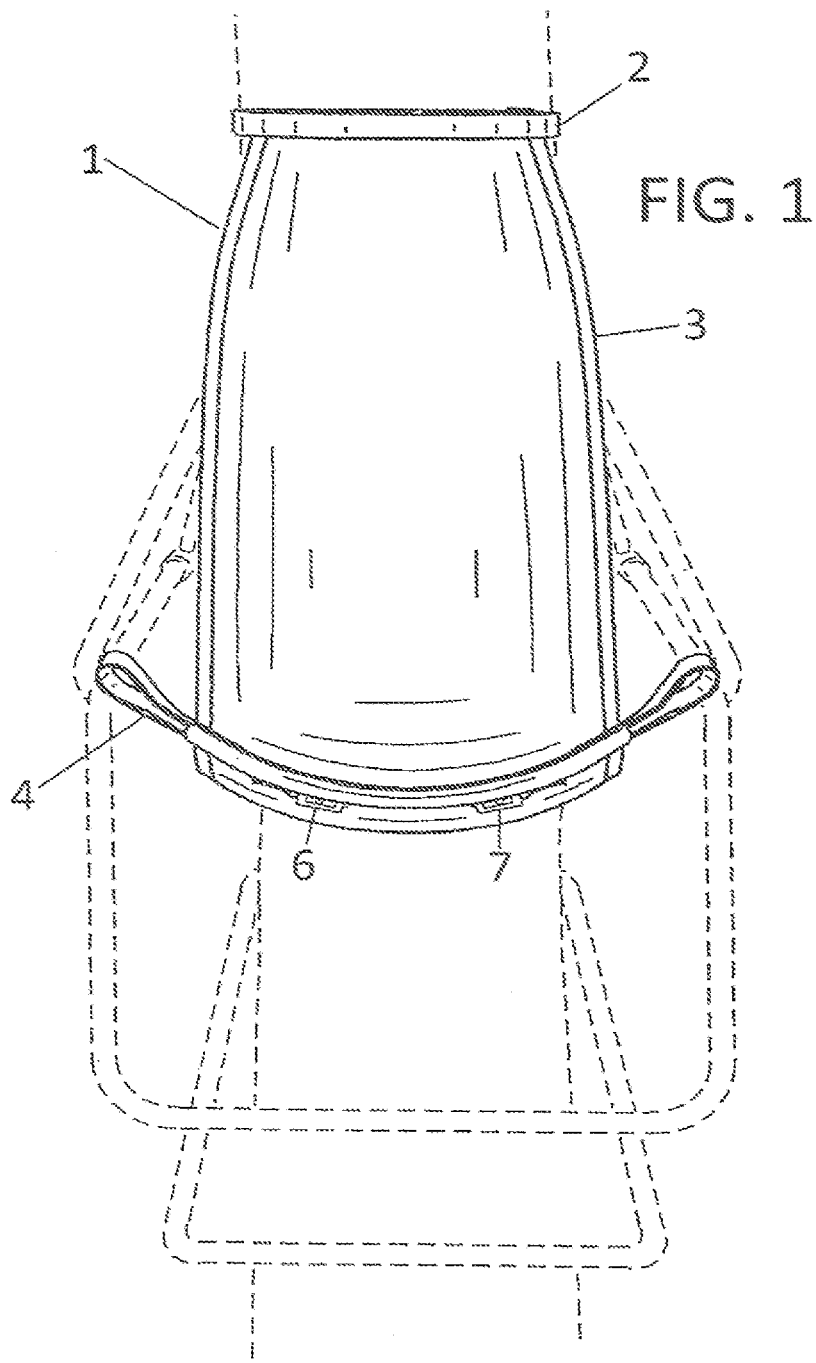
FIG. 1 illustrates one possible use for the seat of the present disclosure with a frame, which is illustrated as a treestand frame, and a cylindrical support or post, which is illustrated as a tree.
Figure 2:
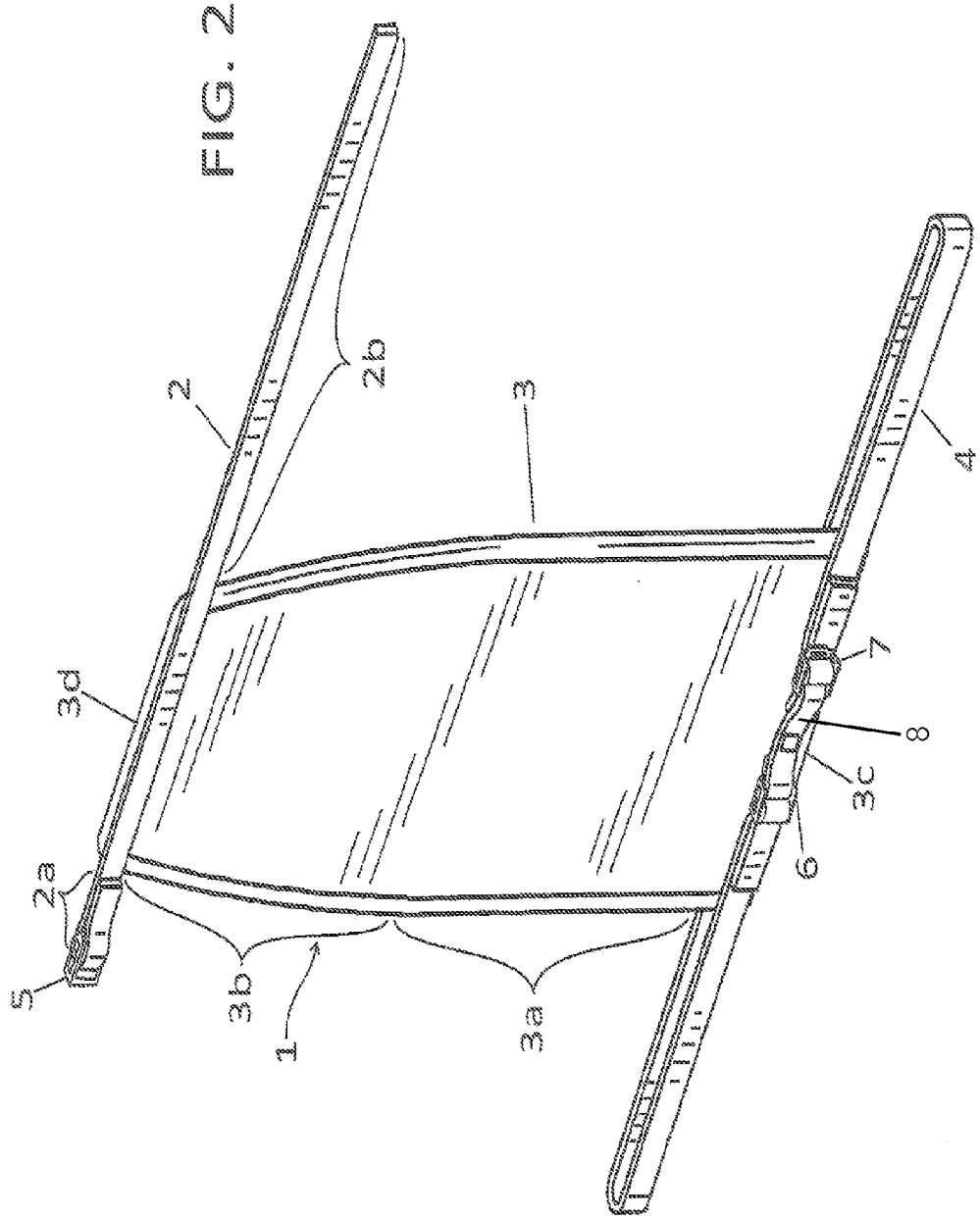
FIG. 2. is a perspective view of an embodiment of the present disclosure.
Figure 4:
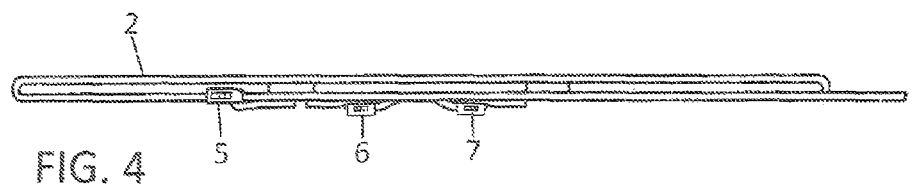
FIG. 4 is a top end view of an embodiment of the present disclosure.
Figure 3:
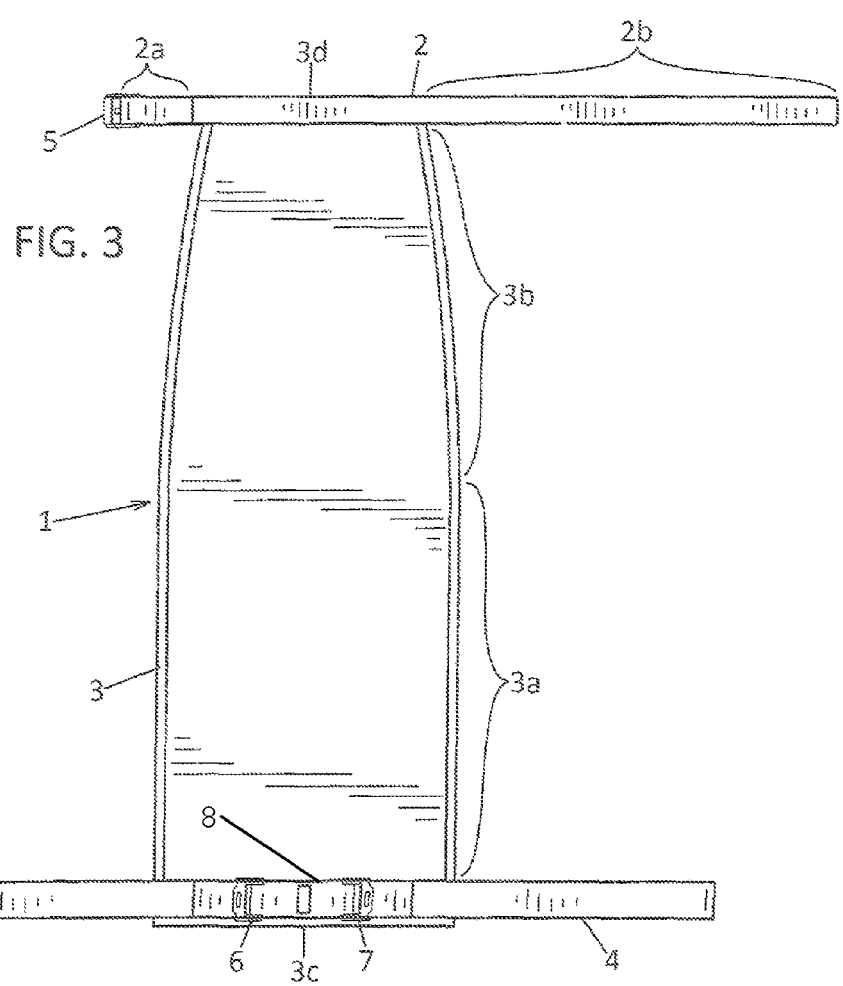
FIG. 3 is a front view of an embodiment of the present disclosure.
Figure 5:
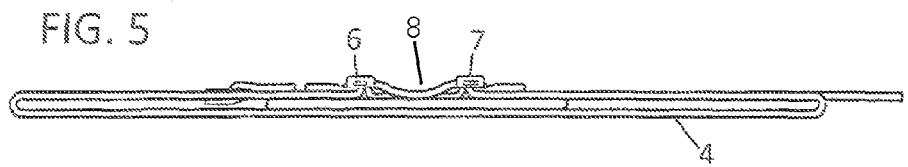
FIG. 5 is a bottom end view of an embodiment of the present disclosure.

As shown in FIGS. 1-5, the sling seat 1 has a first strap 2, a main body defining a seat portion 3, and a second strap 4. The first strap 2 and second strap 4 are integrally attached to the main body 3. The first strap 2 is parallel to the top edge 3*d* of main body 3. The second strap 4 is parallel to the bottom edge 3*c* of main body 3. An inner portion of first strap 2 is integrally attached to the top edge 3*d* of main body 3. An inner portion of second strap 4 is integrally attached to the bottom edge 3*c* of main body 3. The inner integrally attached portion of first strap 2 is coextensive with the top edge 3*d*, i.e., the entire length of top edge 3*d* is directly attached to a portion of first strap 2. The inner integrally attached portion of second strap 4 is coextensive with the bottom edge 3*c*, i.e., the entire length of bottom edge 3*c* is integrally attached to a portion of second strap 4. In a preferred embodiment, the inner integrally attached portion of the first strap 2 and the inner integrally attached portion of second strap 4 are sewn into the top edge 3*d* and bottom edge 3*c*, respectively, of the main body 3. As shown in FIGS. 2 and 3, outer portions (i.e., "ends") of the first strap 2 and second strap 4 extend on either side of main body 3 and are not directly attached to the main body 3 (i.e., are "free"). These outer portions are termed "free ends" in that they are not directly attached to the main body.

The first strap 2 includes a short arm 2*a* and a long arm 2*b*, with a first means for fastening 5 attached to the free end of the short arm 2*a*. In a preferred embodiment, the first means for fastening is a cam lock buckle 5. The illustrated cam lock buckle 5 is a conventional spring-loaded buckle that consists of a metal frame, a spring, and a release tab with gripping teeth. The cam lock buckle is designed so that the release tab grips the first strap 2 with increasing force as the weight on the strap increases. Thus, the cam lock buckle is preferred because it provides a secure, safe fastening of the first strap 2 around a support such as a tree trunk. Alternatively, the first means for fastening may comprise hooks, snaps, VELCRO, or any other mechanism capable of fixedly securing the free ends of the first strap together. The first means for fastening 5 may be attached to the end of the short arm 2a by a variety of means. In the illustrated embodiment the buckle 5 is sewn to the first strap 2.

The first strap 2 is adapted to wrap snugly around a support, such as a tree trunk, with long arm 2b fastened to the free end of short arm 2a by first means for fastening 5 to secure the first strap 2 in place.

The main body 3 is preferably made of a weather resistant, thin, light weight material. An example material suitable for this purpose is trampoline material. The main body 3 has a lower portion 3a of a constant width and a tapered upper portion 3b. The lower portion 3a extends from the bottom edge 3c of the main body 3 over approximately sixty percent (60%) of the height of main body 3. The upper portion 3b tapers such that the width of lower edge 3c is approximately 1.5 times greater than the width of top edge 3d.

The second strap 4 is integrally attached to a first face of the wider bottom edge 3c of the main body 3. The second strap 4 has two free ends (i.e., outer portions which are not directly attached to the main body 3, as defined hereinabove). The free ends are secured to one another and to the main body 3 by second means for fastening 6 and third means for fastening 7. In a preferred embodiment, the second and third means for fastening, 6 and 7, comprise two conventional floating bar-type buckles 6 and 7, as illustrated in the attached drawings. Second means for fastening 6 and third means for fastening 7 are attached to the underside of the seat 3. In the illustrated embodiment, the buckles 6 and 7 are attached to the underside of the seat by a third strap 8 sewn to a second face of the bottom edge of the seat, and buckles 6 and 7 are attached to third strap 8 at opposite ends of the third strap 8.

As shown in FIG. 1, each free end of second strap 4 can be formed into a loop and wrapped around a frame, such as a treestand frame, at two or more attachment points. Second strap 4 is adjustably secured by the second and third means for fastening, 6 and 7. When the seat of the illustrated embodiment is in use, the outermost portions of each free end of second strap 4 are fed through buckles 6 and 7, looped over each floating bar, and then pulled back through buckles 6 and 7 in a direction opposing the initial feed direction so that each outermost portion extends out of each buckle and overlaps a second portion of each respective free end. Each free end of the second strap 4 is then tightened as necessary to secure the seat to 1 the frame.

In use, the seat 1 is attached to the support and frame such that the main body 3 is suspended between first strap 2 and second strap 4, providing a sling-type seat in which the user reclines comfortably without the necessity of relying on the support (e.g., tree) for back support.

The first, second, and third straps 2, 4, and 8 may be made of any material capable of supporting the weight of the user. In a preferred embodiment, the straps are made from woven fabric webbing.

In another embodiment, one or more additional straps can also be provided to secure the seat 1 in its rolled up configuration. Such roll straps make it easier and more convenient to carry the sling seat 1.

In the illustrated embodiment, the sling seat 1 has multiple levels of adjustability. First strap 2 and second strap 4 can each be selectively positioned on the support or frame at multiple possible attachment points. This provides one level of adjustability to the sling seat 1. Second strap 4 can be looped around the frame with varying degrees of snugness, which will cause the bottom edge 3c of the seat portion 3 to take on the shape and tension desired by the user.

Additional embodiments of the disclosed seat can utilize alternative fastening and/or attachment mechanisms having more limited adjustability but providing other benefits readily appreciable to one of ordinary skill in the art.

While preferred embodiments and example configurations have been shown and described, it is to be understood that various further modifications and additional configurations will be apparent to those skilled in the art. All such modifications and configurations are contemplated as being within the scope of the present invention. The specific embodiments and configurations disclosed are illustrative of the preferred and best modes for practicing the invention as defined by the appended claims, and should not be interpreted as limitations on the scope of the invention as defined by the appended claims. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A sling seat for use with a treestand, said seat comprising:
    a main body defining a seat portion, having an upper edge and a lower edge,
    a first strap having an inner portion integrally attached to the upper edge of the main body, said inner portion of said first strap being coextensive with said upper edge, said first strap having two free ends,
    a first means for fastening attached to one of said free ends of said first strap,
    a second strap having an inner portion integrally attached to the lower edge of the main body, said inner portion of said second strap being coextensive with said lower edge, said second strap having two free ends,
    a second means for fastening attached to said lower edge of said main body, and
    a third means for fastening attached to said lower edge of said main body,
    said first means for fastening being configured to fasten together said first and second free ends of said first strap,
    said second means for fastening being configured to fasten one of said free ends of said second strap to said lower edge of said main body,
    said third means for fastening being configured to fasten the other of said free ends of said second strap to said lower edge of said main body;
    wherein said first strap is adapted to be secured around a tree, and
    wherein said second strap is adapted to be secured around a treestand frame.

2. The seat of claim 1, wherein said main body comprises:
    a constant width portion and
    a tapering portion,
    said constant width portion being bounded by the lower edge of the main body and the tapering portion, said tapering portion being bounded by the constant width portion and the upper edge of the main body.

3. The seat of claim 2, wherein said tapering portion tapers such that a width of said bottom edge is approximately 1.5 times greater than a width of said top edge.

4. The seat of claim 2, wherein said constant width portion extends over approximately sixty percent (60%) of a height of said main body.

5. The seat of claim 1, wherein said first means for fastening is a cam lock buckle.

6. The seat of claim 5, wherein said cam lock buckle comprises a frame and a floating bar with gripping teeth, arranged such that a range of movement of said floating bar is constrained by said frame.

7. The seat of claim 1, wherein said second and third means for fastening are floating bar buckles.

8. The seat of claim 1, further comprising:
a third strap attached to the lower edge of the main body, said third strap having two free ends,
wherein said second means for fastening is attached to said lower edge of said main body by being attached to one of said free ends of said third strap, and
wherein said third means for fastening is attached to said lower edge of said main body by being attached to the other of said free ends of said third strap.

9. A sling seat for use with a treestand, said seat comprising:
a main body defining a seat portion, having an upper edge and a lower edge,
a first strap having an inner portion integrally attached along the upper edge of the main body, said inner portion of said first strap being coextensive with said upper edge, said first strap having two free portions extending outwardly from the main body in either direction,
a first means for fastening attached to one of said outwardly extending free portions of said first strap at an outermost point thereof,
said first means for fastening being configured to fasten together said outwardly extending free portions of said first strap,
a second strap having an inner portion integrally attached along the lower edge of the main body on a first face of said main body, said inner portion of said second strap being coextensive with said lower edge, said second strap having two free portions extending outwardly from the main body in either direction,
a third strap attached to the lower edge of the main body on a second face of said main body, said second face opposing said first face, said third strap having a second means for fastening attached to one end of said third strap and a third means for fastening attached to another end of said third strap,
said second means for fastening being configured to fasten one of said outwardly extending free portions of said second strap to said lower edge of said main body on said second face of said main body,
said third means for fastening being configured to fasten the other of said outwardly extending free portions of said second strap to said lower edge of said main body on said second face of said main body,
wherein said first strap is adapted to be secured around a tree, and
wherein said second strap is adapted to be secured around a treestand frame.

* * * * *